United States Patent [19]
Bradt

[11] Patent Number: 5,888,599
[45] Date of Patent: Mar. 30, 1999

[54] MULTI-LAYER LIDDING FILM HAVING IMPROVED HEAT SEAL PROPERTIES AND METHODS RELATING THERETO

[75] Inventor: Richard W. Bradt, Midlothian, Va.

[73] Assignee: E. I. du Pont de Nemours and Company, Wilmington, Del.

[21] Appl. No.: 733,244

[22] Filed: Oct. 2, 1996

Related U.S. Application Data

[63] Continuation-in-part of Ser. No. 621,703, Mar. 26, 1996, which is a continuation of Ser. No. 287,604, Aug. 9, 1994, abandoned, which is a continuation-in-part of Ser. No. 49,544, Apr. 19, 1993, abandoned.

[51] Int. Cl.$^6$ .............................. B32B 7/06; B32B 7/10; B32B 27/30; B32B 27/36

[52] U.S. Cl. ...................... 428/35.7; 428/40.1; 428/42.2; 428/42.3; 428/332; 428/339; 428/347; 428/349; 428/354; 428/355 R; 428/480; 428/483; 220/500; 220/523; 220/359; 156/308.4; 156/327; 229/123.1; 229/123.2; 229/245; 229/902

[58] Field of Search .................. 428/35.7, 36.6, 428/36.7, 480, 483, 343, 346, 347, 349, 352, 355 R, 41.5, 42.2, 42.3, 915, 916, 40.1, 332, 339, 354; 29/123.1, 123.2, 245, 902, 903, 905; 156/308.7, 327; 220/500, 523, 359

[56] References Cited

U.S. PATENT DOCUMENTS

| | | | |
|---|---|---|---|
| 3,057,792 | 10/1962 | Frohlich | 204/165 |
| 3,960,636 | 6/1976 | Moffitt | 156/290 |
| 4,041,206 | 8/1977 | Tsunashima et al. | 428/409 |
| 4,139,643 | 2/1979 | Hix et al. | 426/122 |
| 4,188,443 | 2/1980 | Mueller et al. | 428/216 |
| 4,211,825 | 7/1980 | Shipman | 428/483 |
| 4,239,973 | 12/1980 | Kolbe et al. | 250/531 |
| 4,274,900 | 6/1981 | Mueller et al. | 156/229 |
| 4,375,494 | 3/1983 | Stokes | 428/323 |
| 4,410,600 | 10/1983 | McGrail | 428/483 |
| 4,469,754 | 9/1984 | Hoh et al. | 428/476.3 |
| 4,504,531 | 3/1985 | Murata et al. | 428/35 |
| 4,521,467 | 6/1985 | Berger | 428/35 |
| 4,554,303 | 11/1985 | Petke et al. | 524/277 |
| 4,571,363 | 2/1986 | Culbertson et al. | 428/332 |
| 4,741,957 | 5/1988 | Park | 428/349 |
| 4,765,999 | 8/1988 | Winter | 426/113 |
| 4,788,105 | 11/1988 | Mueller et al. | 428/412 |
| 4,876,123 | 10/1989 | Rivera et al. | 428/34.2 |
| 4,881,649 | 11/1989 | Hsu et al. | 206/634 |
| 4,915,289 | 4/1990 | Hatano et al. | 229/123.1 |
| 4,937,139 | 6/1990 | Genske et al. | 428/349 |
| 5,059,470 | 10/1991 | Fukuda et al. | 428/142 |
| 5,061,532 | 10/1991 | Yamada | 428/35.7 |
| 5,156,904 | 10/1992 | Rice et al. | 428/219 |
| 5,175,035 | 12/1992 | Pinsolle et al. | 428/35.7 |
| 5,244,342 | 9/1993 | De Dompierre | 414/790.8 |
| 5,353,985 | 10/1994 | Nageli et al. | 229/123.1 |

FOREIGN PATENT DOCUMENTS

| | | |
|---|---|---|
| 2065426 | 3/1991 | Canada . |
| 0175451 | 3/1986 | European Pat. Off. . |
| 0 399 981 | 11/1990 | European Pat. Off. . |
| 3929942 A1 | 3/1981 | Germany . |
| 3925141 A1 | 1/1991 | Germany . |
| 682996 A5 | 12/1993 | Germany . |
| 3297640 A | 12/1991 | Japan . |
| 2 055 687 | 7/1980 | United Kingdom . |
| 93/17863 | 9/1993 | WIPO . |
| WO 95/06561 | 3/1995 | WIPO . |

OTHER PUBLICATIONS

PCT/US 97/17609 (Applicant's file reference AD6143C) PCT International Search Report dated Feb. 9, 1998.

*Primary Examiner*—Vivian Chen

[57] ABSTRACT

The present invention relates generally to a multi-layer lidding film and a package with the lidding film heat-sealed thereto as a cover. The multi-layer film comprises: 1) a support layer, such as polyester, 2) a non-crosslinked amorphous acrylic interface layer, and 3) an outer copolyester heat seal layer. The acrylic interface layer advantageously limits the peel strength of the heat seal, making it easy for consumers to open the lidded package while still provides heat seal reliability and allowing the film to be heat-sealed to the package.

17 Claims, 1 Drawing Sheet

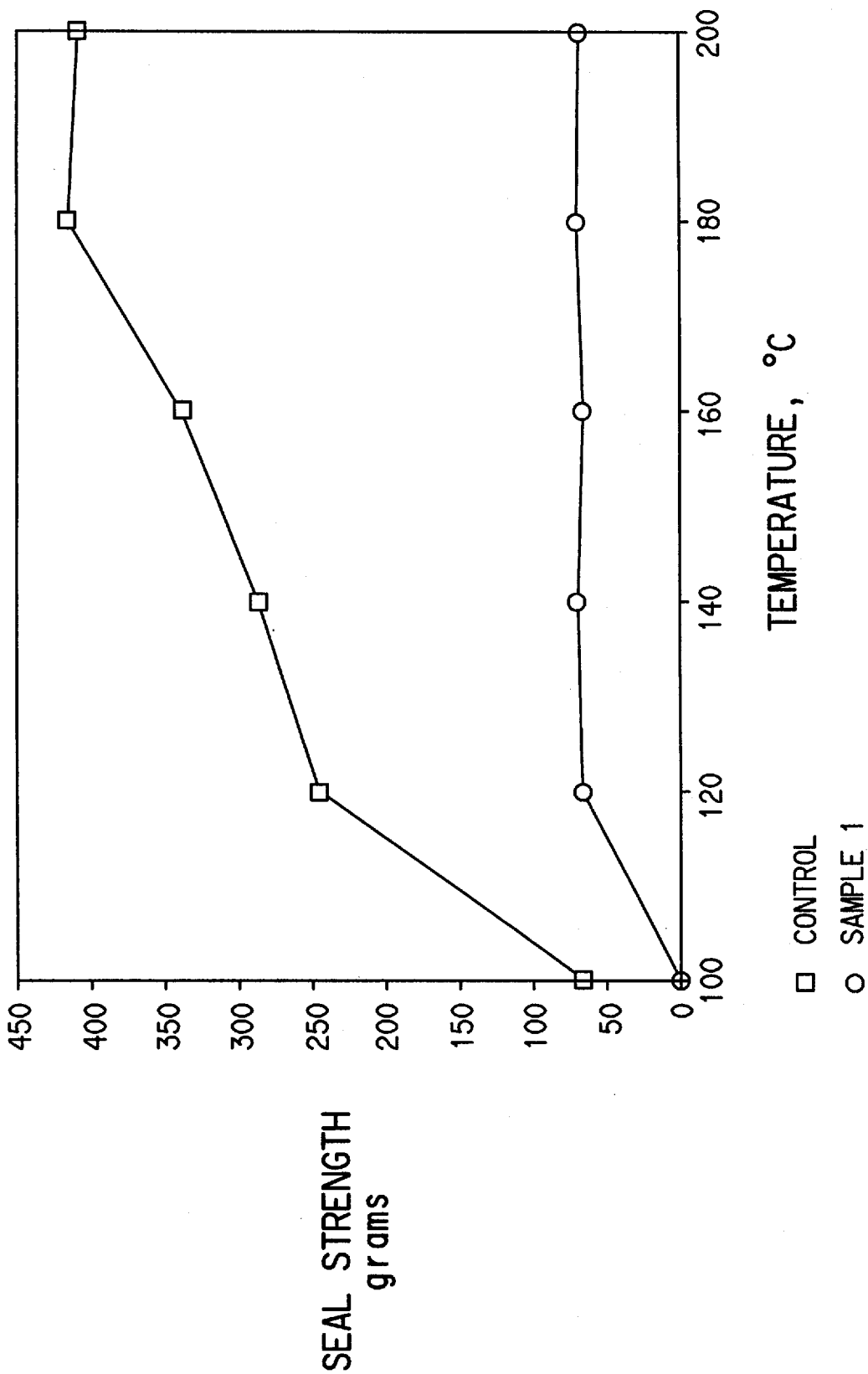

MULTI-LAYER LIDDING FILM HAVING IMPROVED HEAT SEAL PROPERTIES AND METHODS RELATING THERETO

The present invention is a continuation-in-part of application Ser. No. 08/621,703, filed Mar. 26, 1996, which is a continuation of Ser. No. 08/287,604, filed Aug. 9, 1994, abandoned, which is a continuation-in-part of Ser. No. 08/049,544, filed Apr. 19, 1993, abandoned.

FIELD OF THE INVENTION

The present invention relates generally to an easily opened multilayer lidding film having excellent seal integrity. More specifically, the lidding films of the present invention are multilayer structures comprising: 1. a support layer, 2. a thin, high modulus acrylic interface layer; and 3. a co-polyester heat seal outer layer.

BACKGROUND OF THE INVENTION

Generally speaking, conventional lidding films either: 1. provide reliable seal integrity but are often difficult to open; or 2. are easily opened but provide less reliable seal integrity. The present invention eliminates this trade-off; that is, the lidding films of the present invention are easily opened by consumers and have reliable heat seals, even at very low temperatures.

U.S. Pat. No. 4,375,494 to Stokes discloses multilayer films having a semi-crystalline polyester support layer and an amorphous polyester heat seal layer. The heat seal layer further comprises a finely divided particulate additive.

SUMMARY OF THE INVENTION

Overview

The present invention is directed to an improved multilayer lidding film comprising:

a) an outer heat seal layer comprising an amorphous copolyester base polymer, wherein:
  i) 15–95 mole % of the base polymer is ethylene terephthalate,
  ii) 5–85 mole % of the base polymer is derived from a member of (or the ester forming equivalents of) the group consisting of:
    a) one or more diacids other than terephthalic acid;
    b) one or more diols other than ethylene glycol; and
    c) mixtures of a) and b),
b) a thin (0.01 to 0.8 grams per square meter, more preferably 0.1–0.7 grams per square meter and yet more preferably 0.3–5 grams per square meter) acrylic interface layer (preferably, the acrylic is non-crosslinked) having an inner and outer surface, the outer surface being bonded to the heat seal layer, the interface layer comprising an acrylic polymer, preferably at least 70 weight percent of the acrylic polymer being derived from an acrylic acid monomer, a methacrylic acid monomer, an alky ester of acrylic acid monomer or an alkyl ester of methacrylic acid monomer, and
c) a support layer bonded to the inner surface of the interface layer.

Upon heat sealing the outer sealant layer to a peripheral, polyester surface of a tray (or similar-type packaging support) and thereby sealing the lidding film over the opening of the support, the peel strength needed to delaminate the lidding film from the polyester substrate of the tray is generally less than 200 grams per linear inch (or per 2.56 centimeters), preferably less than 150 grams per 2.56 centimeters, even at low temperatures, such as –5 degrees Centigrade (temperatures which are commonly encountered when opening packaged frozen foods). Furthermore, the heat seal is reliable and durable.

Such advantageous heat seal properties are believed to be due to the fact that from 4% to 96% of the delamination occurs between the polyester tray (or similar-type packaging support) and heat seal layer, and the remaining delamination occurs between the acrylic interface layer and the sealant layer (virtually none of the delamination occurs between the interface layer and the support layer). Applicant has discovered that peel strength can vary along the length of the boundary between the copolyester heat seal layer and the polyester substrate. This disparency along the seal can be affected by changes in heat seal temperature, line speed, heat sealing equipment, irregularities on the tray surface and the like.

The portion(s) of the heat seal which provide a very high level of seal strength also provide reliable and durable heat seals. However, these high peel strength portions of the heat seal also create difficulty for the consumer in peeling the lidding film away from the substrate, particularly at temperatures of about 0 degrees Centigrade or less, such as, in the case of frozen food packaging. If the seal temperature is decreased or the heat sealing process otherwise modified to inhibit the creation of these high peel strength portions, then the lidding material is easier to peel open, but seal reliability worsens and concerns about unwanted "leakers" increases.

Applicant has discovered a type of high modulus acrylic material which when incorporated into an interface layer and bonded to the heat seal layer, exhibits delamination from the heat seal layer which is:

1. less than the "high peel strength" portions of the heat seal between the heat seal layer and substrate; and
2. greater than other portions of the heat seal between the heat seal layer and substrate.

In this way, the high peel strength portions of the heat seal can be created to provide heat seal reliability, but the lidding film is nevertheless easy to open, because as the film delaminates and encounters seal areas of high peel strength, the delamination phenomena will move to the area between the acrylic interface layer and the heat seal layer, but once this transferred delamination moves beyond the area of high peel strength, the delamination will move back to the interface between the substrate and heat seal layer. Hence, the delamination will tend to exhibit a zig-zag peel configuration or is otherwise discontinuous, involving more than one plane which is parallel to the substrate upon which the film is heat sealed. Preferably, the peel strength between the interface layer and the heat seal layer is in the range of about 80–200 grams per linear inch (80–200 grams per 2.56 centimeters), more preferably about 100–175 grams per linear inch (100–175 grams per 2.56 centimeters).

The resulting lidding film provides a high level of seal reliability, but the lidding film is easily delaminated from a polyester substrate by a consumer, even if the package is opened at a cold temperature (e.g., just after it is removed from a freezer). Hence after the film is peeled from the substrate, about 4 to about 96 percent of the film surface (which was originally sealed to the substrate) remains with the film, and the remaining film surface has been torn from the film and remains bonded to the substrate. The delamination phenomenon generally results in a plurality of domains or film portions which remain bonded to the substrate.

Once a heat sealing temperature is applied to the lidding film and the film is sealed to a polyester substrate, the peel strength of the heat seal will be advantageously limited by the interface layer. Hence, the lidding film can be used in a wide range of heat seal applications, and the resulting heat seal will be effective in protecting the product, but not so strong as to frustrate consumers as they attempt to open the package.

BRIEF DESCRIPTION OF THE DRAWINGS

The FIGURE is a graph depicting the seal strengths for a film according to the present invention and a comparative film.

DETAILED DESCRIPTION OF THE PREFERRED EMBODIMENT AND BEST MODE

Support Layer

The support layer can be virtually any material capable of carrying the interface layer and heat-seal layer without interfering with the intended function of those two layers. The preferred support layer comprises polyester, most preferably, biaxially oriented poly(ethylene terephthalate) ("oriented PET").

Useful polyester films of the present invention can be manufactured from various thermoplastic polyester resins, such as:
1. polyethylene terephthalate,
2. polytetramethylene terephthalate,
3. polyethylene, 2,6-napthalate,
4. poly-1,4-cyclohexylene dimethyl terephthalate,
5. and the like.

Polyester copolymers may also be used such as:
1. polyethylene terephthalatersophthalate,
2. polyethylene terephthalate/adipate,
3. polyethylene terephthalate/sebacate,
4. polyethylene terephthalatetsulphoisophthalate,
5. polyethylene terephthalatelazelate,
6. and the like.

Biaxially oriented polyethylene terephthalate homopolyester is preferred.

The polyester films of the present invention can be manufactured by an extrusion process, such as a cast film or blown film process. In a cast film process, the polyester resin is first heated to a molten state and then extruded through a wide slot die in the form of an amorphous sheet. The sheet-like extrudate is rapidly cooled or "quenched" to form a cast sheet of polyester by contacting and traveling partially around a polished, revolving casting drum.

Alternatively, the extrudate can be blown in a conventional blown film process. Regardless of the process however, the polyester sheet is preferably uniaxially or biaxially (preferably biaxially) stretched in the direction of film travel (machine direction) and/or perpendicular to the machine direction (traverse direction), while being heated to a temperature range of from about 80° C. to 160° C., preferably about 90° C. to 100° C. The degree of stretching may range from 3.0 to 5.0 times the original cast sheet unit dimension, preferably from about 3.2 to about 4.2 times the original cast sheet dimension.

Definitions

As used in this specification and accompanying claims:
1. "(meth)acrylic" is intended to mean either "acrylic" or "methacrylic"; and
2. "(meth)acrylate" is intended to mean either "acrylate" or "methacrylate".

Interface Layer

The interface layer is preferably derived from a composition comprising (meth)acrylic resin. The preferred such resins are alkyl esters of acrylic acid or methacrylic acid where the alkyl group has from 1–18 carbon atoms such as:
1. methyl(meth)acrylate,
2. ethyl(meth)acrylate,
3. propyl(meth)acrylate,
4. isopropyl(meth)acrylate,
5. various butyl(meth) acrylates,
6. cyclohexyl(meth)acrylate,
7. benzyl(meth)acrylate,
8. phenyl(meth)acrylate,
9. hexyl, octyl, dodecyl, hexadecyl, or octadecyl (methmacrylates,
10. Iauryl(meth)acrylate,
11. and the like.

Optionally, other monomers can also be used, such as:
1. acrylonitrile,
2. methacrylonitrile,
3. acrylamide,
4. methacrylamide,
5. styrene,
6. alpha-methyl styrene,
7. vinyl toluene,
8. acrylic acid,
9. methacrylic acid,
10. maleic acid or its anhydride,
11. fumaric acid,
12. crotonic acid,
13. allyl methacrylate or acrylate,
14. allyl acetate,
15. glycidyl methacrylate or acrylate,
16. alkyl amino alkyl methacrylate, or acrylate, such as, t-butyl amino ethyl methacrylate, dimethyl amino ethyl methacrylate;
17. hydroxy alkyl acrylates or methacrylates such as, hydroxyethyl methacrylate
18. hydroxy ethyl vinyl ether,
19. hydroxyethyl vinyl sulfide,
20. vinyl pyrrolidone,
21. and the like.

Although non-crosslinking acrylic resins are preferred, crosslinking resins might be appropriate in certain embodiments of the present invention. To create a crosslinking (meth)acrylic resin, the following can be incorporated into the resin:
1. N-methylol acrylamide,
2. N-methylol methacrylamide, and
3. (meth)acrylamide.

N-methylol acrylamide and N-methylol methacrylamide are preferred due to their "self-crosslinking" ability (they are able to react with another N-methylol functional group). By contrast, acrylamide and methacrylamide alone are generally not crosslinkable, unless a second functional group is also included in the resin composition, such as:
1. melamine-formaldehyde,
2. urea-formaldehyde resin,
3. aziridines,
4. glycoluril-formaldehyde, 5. benzo guanamines,
6. acrylamide glycolic acid,
7. bis-acrylamido glyoxal,
8. diacrylamido acetic acid,
9. and the like.

If (meth)acrylamide is employed, the preferred amount of a second reactional resin such as melamine-formaldehyde or urea-formaldehyde may generally be present from about 0.1 to about 5 weight percent based on the total weight of the coating composition.

The preferred (meth)acrylic resin of the present invention comprises about 65 mole % methyl methacrylate, about 33 mole % ethyl acrylate and about 2 mole % acrylic acid and would also include variations and derivations thereto.

Generally speaking, adhesion chemistry is often difficult to predict. Hence ordinary skill and experimentation may be necessary in discerning all possible embodiments of the present invention, depending upon the desired heat seal performance for any particular application of the present invention.

Although it would be impossible for Applicant to test every possible acrylic material to determine its effectiveness in this particular application, once an ordinary artisan reads this specification and accompanying claims and thereby learns of the advantages of using an (meth)acrylic interface layer to modify heat seal peel strength, such an artisan will easily be able to undertake routine experimentation in discerning new embodiments of the present invention.

Preferably, the interface layer is applied as a coating by means of: 1. an emulsion or dispersion, using an appropriate solvent; 2. an extrusion coating; and/or 3. a coextrusion. The coating thickness is preferably about 0.01 to about 0.80 grams per square meter, more preferably about 0.1 to about 0.7 grams per square meter and yet more preferably about 0.3 to about 0.6 grams per square meter.

In addition to the (meth)acrylic copolymer, the interface layer composition may also contain other materials commonly used and known in the art, such as antioxidants, tackifiers, stabilizers, fillers, extender resins, waxes, foaming agents, crosslinking agents, elastomers, and the like.

The (meth)acrylic resins of the present invention are generally available in the marketplace. Alternatively, they can be synthesized by emulsion polymerization using conventional techniques.

Support Layer+Interface Layer

The interface layer is preferably applied to the support layer by conventional coating techniques (e.g., solution coating, dispersion coating, coextrusion, extrusion coating, and the like). Prior to coating the polyester film surface, the film may be surface-treated in any conventional manner, depending upon the particular application and performance required from the final product.

Electric corona discharge is a conventional surface treatment which is commonly performed on polyester films to enhance the film's surface qualities, especially its adhesive and printing properties. Electric corona discharge methods and apparatus are described in U.S. Pat. Nos. 3,057,792 and 4,239,973.

For uniaxially oriented film, the corona treatment followed by the coating may occur during the in-line manufacturing process. Heating the film before stretch orientation will generally be necessary to drive off the coating solvent.

The polyester sheet can be coated with the interface layer using any of the well known coating techniques. For example, the film may be coated by roller coating, spray coating, gravure coating, slot coating, or extrusion coating, preferably gravure or roller coating. The heat applied to the film during the subsequent preheating, stretching, and heat-setting stages is generally sufficient to evaporate the coating solvent and crosslink the acrylic coating, if a crosslinkable monomer comprises a portion of the acrylic coating.

The coated, oriented polyester film may then be heat treated for a period of time necessary to crystallize the film. Crystallization imparts dimensional stability and good tensile properties to the polyester film. Oriented polyethylene terephthale film may be heat set at a temperature ranging from 190° C. to 240° C., preferably from 215° C. to 235° C. The coated crystalline, oriented polyester film is generally then wound onto a roll.

An alternative to this on-line process is to coat the film off-line (after manufacture of the film is complete). Off-line operations can be conducted by a secondary facility, such as a converter, who obtains intermediate films and further processes it for specific customers.

Copolyester Component

The heat seal layer is an amorphous copolyester, wherein:
1. about 15–95 mole % of the copolyester is ethylene terephthalate; and
2. about 5–85 mole % of the copolyester is derived from a diacid other than terephthalic acid and/or a diol other than ethylene glycol, thereby interrupting the semi-crystalline nature of the ethylene terephthalate segments and causing the copolyester to be substantially amorphous; and wherein,
1. the intrinsic viscosity of the final copolyester composition is preferable in the range of about 0.5–1.0, more preferably 0.58–0.8; and
2. the glass transition temperature of the final composition is less than about 100° C., more preferable, less than about 80° C., and most preferably less than about 75° C.

Examples of useful acid monomers which can be incorporated into the copolyester include:
1. succinic acid,
2. adipic acid,
3. azelaic acid,
4. sebacic acid,
5. 1,10 decanedicarboxylic acid,
6. phthalic acid,
7. isophthalic acid,
8. dodecanedioic acid,
9. and the like.

Preferred such comonomers include azelaic and isophthalic.

Examples of polyols which can be incorporated into the polyester include:
1. methoxypolyalkylene glycol
2. neopentyl glycol,
3. propylene glycol,
4. 1,4 butane diol,
5. trimethylene glycol,
6. propylene glycol,
7. tetramethylene glycol,
8. hexamethylene glycol,
9. diethylene glycol,
10. cyclohexane dimethanol,
11. and the like.

Generally speaking, the heat seal layer will heat seal to itself at temperatures greater than about 100° C., and the peel strength of the heat seal will increase with increasing heat sealing temperatures. Generally, the peel strength will exceed 150 grams per inch (or per 2.56 centimeters) when heat sealed to itself at heat seal temperatures above about 100° C. Hence, the packaging films of the present invention utilize the advantageous heat seal temperature ranges of copolyester heat seal materials, while overcoming the problem of consumer frustrations involving "difficult to open" packages.

Tray Component.

The lidding film is preferably heat sealed over a tray. The term "tray" is intended to be broadly interpreted to cover any tray or tray-like structure, such as any packaging structure capable of supporting a lidding film and having an indentation or recess which the lidding film can cover to thereby enclose a product located within the indentation or recess. At least a portion of the tray has sufficient structural integrity to sufficiently support the film during packaging operations, handling and/or the like. Preferably, the portion of the tray contacting the lidding film is rigid and comprises a polyethylene terephthalate homopolymer or copolymer. A polyethylene terephthalate copolymer comprises at least about 45 mole percent ethylene terephthalate and the balance being ester segments other than ethylene terephthalate.

EXAMPLE 1

Support Layer: biaxially oriented polyethylene
terephthalate, 0.5 mil thickness
(hereafter, SUPPORT LAYER)
Interface Layer: a polymer of 65 mole % methyl
methacrylate,
33 mole % ethyl acrylate and
2 mole % acrylic acid
(hereafter, INTERFACE MATERIAL)
Heat Seal Layer: ADCOTE 40-60D™ polyethylene
terephthalate
copolyester available from Morton International
(hereafter,
HEAT SEAL MATERIAL), and
CONTROL FILM: The HEAT SEAL MATERIAL was coated directly onto the SUPPORT LAYER (an INTERFACE LAYER was omitted) in an amount of about 2 grams of HEAT SEAL MATERIAL per square meter of SUPPORT LAYER.

EXAMPLE FILM: The SUPPORT LAYER was solution coated with the INTERFACE MATERIAL in an amount of about 0.4 grams INTERFACE MATERIAL per square meter of the SUPPORT LAYER; thereafter the INTERFACE MATERIAL coating was solution coated in an amount of about 2 grams of HEAT SEAL MATERIAL per square meter of the SUPPORT LAYER.

Equipment

The coating equipment used 12 inch (30.7 cm) wide feed rolls, coating rolls, and a drying tower at about 104° C. (220° F.) (counter-current air drying). The interface coating solutions were about 7.5 to about 15 weight percent solids in an aqueous solution at ambient temperature. The copolyester coating solutions were about 10 to about 20 weight percent solids in a tetrahydrofuran solution comprising about 1.5 weight percent fillers, waxes, stabilizers and the like at about 50° C. An 11 inch (28.2 cm) wide PET film was fed into the coating bath at about 50 feet per minute, and a dwell time during drying of about 0.2 minutes.

Results

The EXAMPLE FILM and the CONTROL FILM were each used as a lidding film and heat sealed at a temperature of about 120° C. over the opening of a polyester tray. The lidding films were peeled from the polyester trays at about 20 degrees Centigrade and at a rate of about 0.5 centimeters per second. The Control had a peel strength in excess of about 200 g/inch (grams per 2.56 centimeters). The SAMPLE FILM had peel strengths in the range of about 100–150 g/inch (grams per 2.56 centimeters) as shown in the FIGURE.

The CONTROL FILM and the SAMPLE FILM were each heat sealed at temperatures of from about 100° to 200° C. Seal strength in grams per inch are plotted against heat seal temperature in the FIGURE. The SAMPLE FILM had excellent seal strength over the broad range from 102° C. to 200° C. The CONTROL FILM seals were stronger than desired over the same temperature range.

Peel strengths above about 50 g/inch (grams per 2.56 centimeters) are generally sufficient to seal a package for typical use, and seals having peel strengths above about 200 g/inch are generally rather difficult for an average consumer to pull apart. The SAMPLE FILM provided excellent heat seal performance.

What is claimed is:

1. A package comprising:
   A) a packaging support having a floor and a continuous wall extending from the floor and defining a perimeter around at least a portion of the floor, the wall having a top edge, the top edge comprising polyethylene terephthalate homopolymer or copolymer, the packaging support wall and packaging support floor defining a recess, wherein the top edge of the wall defines an opening to the recess,
   B) a lidding film heat sealed to at least a portion of the top edge of the packaging support wall, thereby enclosing a product within a space defined by: 1) at least a portion of the packaging support floor, 2) the packaging support wall, and 3) the lidding film, the lidding film having:
      a) an outer heat seal layer which is heat sealed to the top edge of the packaging support wall, the heat seal layer comprising an amorphous copolyester base polymer, wherein:
         i) 10–60 mole % of the base polymer is ethylene terephthalate, and
         ii) 5–60 mole % of the base polymer is derived from a member of the group consisting of:
            I.) one or more diacids other than terephthalic acid;
            II.) one or more diols other than ethylene glycol;
            III.) mixtures of I.) and II.), and
            IV.) ester forming equivalents of I., II., and III.
      b) an interface layer bonded to the heat seal layer, the interface layer having a thickness of about 0.01 to 0.8 grams per square meter, the interface layer comprising a non-crosslinked, amorphous acrylic polymer,
      c) a support layer bonded to the interface layer,
      wherein the lidding film is heat sealed to the packaging support at a heat sealing temperature of at least 90 degrees Centigrade and wherein upon peeling the lidding film from the packaging support at a temperature in the range of 15 to 25 degrees Centigrade and at an average speed of at least 1 millimeter per second, delamination occurs both: 1. between the top edge of the packaging support and the heat seal layer of the lidding film; and 2. between the interface layer and the heat seal layer, so that upon peeling the lidding film away from the packaging support, a plurality of portions of the heat seal layer will remain bonded to the top edge of the packaging support and a plurality of portions of the heat seal layer will remain bonded to the interface layer of the lidding film, and wherein at a temperature of 15–25 degrees Centigrade, the average effort required to delaminate the lidding film, at a rate of at least 1 millimeter per second, from the packaging support is, on average, less than 200 grams per 2.56 centimeters.

2. A package in accordance with claim 1, wherein the lidding film has a peel strength of less than 150 grams per 2.56 centimeters, when delaminating the lidding film from the package support at a temperature between 15–25 degrees Centigrade and at a rate of at least 1 millimeter per second and wherein the interface layer has a thickness in the range of 0.2 to 0.7 grams per square meter.

3. A package in accordance with claim 2 wherein the support layer comprises oriented polyethylene terephthalate.

4. A package in accordance with claim 2, wherein the interface layer comprises an alkyl ester of (meth)acrylic acid.

5. A package in accordance with claim 2, wherein the interface layer comprises a) methyl (meth)acrylate/or ethyl (meth)acrylate, and b) acrylic acid.

6. A package in accordance with claim 2, wherein the interface layer comprises methyl (meth)acrylate or ethyl (meth)acrylate.

7. A package in accordance with claim 2, wherein the copolyester heat seal layer is derived from terephthalic acid, ethylene glycol and a diacid or diol other than terephthalic acid and ethylene glycol.

8. A package in accordance with claim 2, wherein the heat seal layer is a blend of copolyesters.

9. A multi-layer lidding film comprising:
a) a first copolyester outer heat seal layer comprising an amorphous copolyester base polymer, wherein:
   i) 10–60 mole % of the base polymer is ethylene teraphthalate,
   ii) 5–60 mole % of the base polymer is derived from a member of the group consisting of:
      I.) one or more diacids other than terephthalic acid;
      II.) one or more diols other than ethylene glycol;
      II.) mixtures of I.) and II.), and
      IV.) ester forming equivalents of I., II. and II;
b) an interface layer bonded to the heat seal layer, the interface layer having a thickness of about 0.01 to 0.8 grams per square meter, the interface layer comprising a non-crosslinked amorphous acrylic polymer; and
c) a support layer bonded to the interface layer;
said multi-layer film is characterized by:
   a heat seal defining a delamination with a peel strength of less than 200 grams per linear inch at a peel temperature in the range of about −5° C. to about 25° C. and at an average peel speed of at least 1 millimeter per second, upon placing the copolyester heat seal layer in contact with a polyester surface and heating the multi-layer film effecting a heat seal to said the polyester surface at a temperature in the range of above 100° C. to about 200° C.

10. The multi-layer film of claim 9, further characterized by a delamination with a peel strength of about 100 to 175 grams per linear inch.

11. The multi-layer film of claim 9, further characterized by a delamination occurring in both:
   a) between the copolyester heat seal layer and the polyester surface; and
   b) between the interface layer and the copolyester heat seal layer;
so that upon peeling the lidding film from the polyester surface, a plurality of portions of the copolyester outer heat seal layer will remain bonded to the polyester surface and a plurality of portions of the heat seal layer will remain bonded to the interface layer.

12. The multi-layer film of claim 9, further characterized by:
   a) a peel strength of less than 150 grams per inch; and
   b) the interface layer having a thickness in the range of 0.2 to 0.7 grams per square meter.

13. The multi-layer film of claim 12, wherein the support layer comprises oriented polyethylene terephthalate.

14. The multi-layer film of claim 12, wherein the interface layer comprises an alkyl ester of (meth)acrylic acid.

15. The multi-layer film of claim 12, wherein the copolyester heat seal layer is derived from: terephthalic acid, ethylene glycol, and a diacid or diol other than terephthalic acid and ethylene glycol.

16. The multi-layer film of claim 12, wherein the heat seal layer is a blend of copolyesters.

17. A process for heat sealing a multi-layer film to effect a heat seal, said process comprising:
A) contacting said multi-layer film with a polyester surface layer, said multi-layer film comprising:
   a) a first copolyester outer heat seal layer comprising an amorphous copolyester base polymer, wherein:
      i) 10–60 mole % of the base polymer is ethylene teraphthalate,
      ii) 5–60 mole % of the base polymer is derived from a member of the group consisting of:
         I.) one or more diacids other than terephthalic acid;
         II.) one or more diols other than ethylene glycol;
         III.) mixtures of I.) and II.), and
         IV.) ester forming equivalents of I., II. and II;
   b) an interface layer bonded to the heat seal layer, the interface layer having a thickness of about 0.01 to 0.8 grams per square meter, the interface layer comprising a non-crosslinked amorphous acrylic polymer; and
   c) a support layer bonded to the interface layer;
B) heat sealing said multi-layer film with said polyester surface layer at a temperature effecting a heat seal between said film and said copolyester surface;
wherein:
   said heat seal defining a delamination with a peel strength of less than 200 grams per linear inch at a peel temperature in the range of about −5° C. to about 25° C. and at an average peel speed of at least 1 millimeter per second, upon heating said film to a heat sealing temperature in the range of above 100° C. to about 200° C.

* * * * *

UNITED STATES PATENT AND TRADEMARK OFFICE
CERTIFICATE OF CORRECTION

PATENT NO. : 5,888,599
DATED : March 30, 1999
INVENTOR(S) : Richard W. Bradt It is certified that error appears in the above-identified patent and that said Letters Patent is hereby corrected as shown below:

Claim 5, column 9, line 21, change "(meth)acrylate/or" to --(meth)acrylate or--
Claim 9 a) ii) IV.), column 9, line 42, change "II. and II;" to --II. and III;--
Claim 17 A) a) ii) IV.), column 10, line 42, change "II. and II;" to --II. and III;--

Signed and Sealed this

Third Day of April, 2001

*Attest:*

NICHOLAS P. GODICI

*Attesting Officer*   *Acting Director of the United States Patent and Trademark Office*